May 17, 1938.  F. H. STANTON  2,117,687
SQUEEZER AND CUTTER
Filed Feb. 5, 1936    2 Sheets-Sheet 2
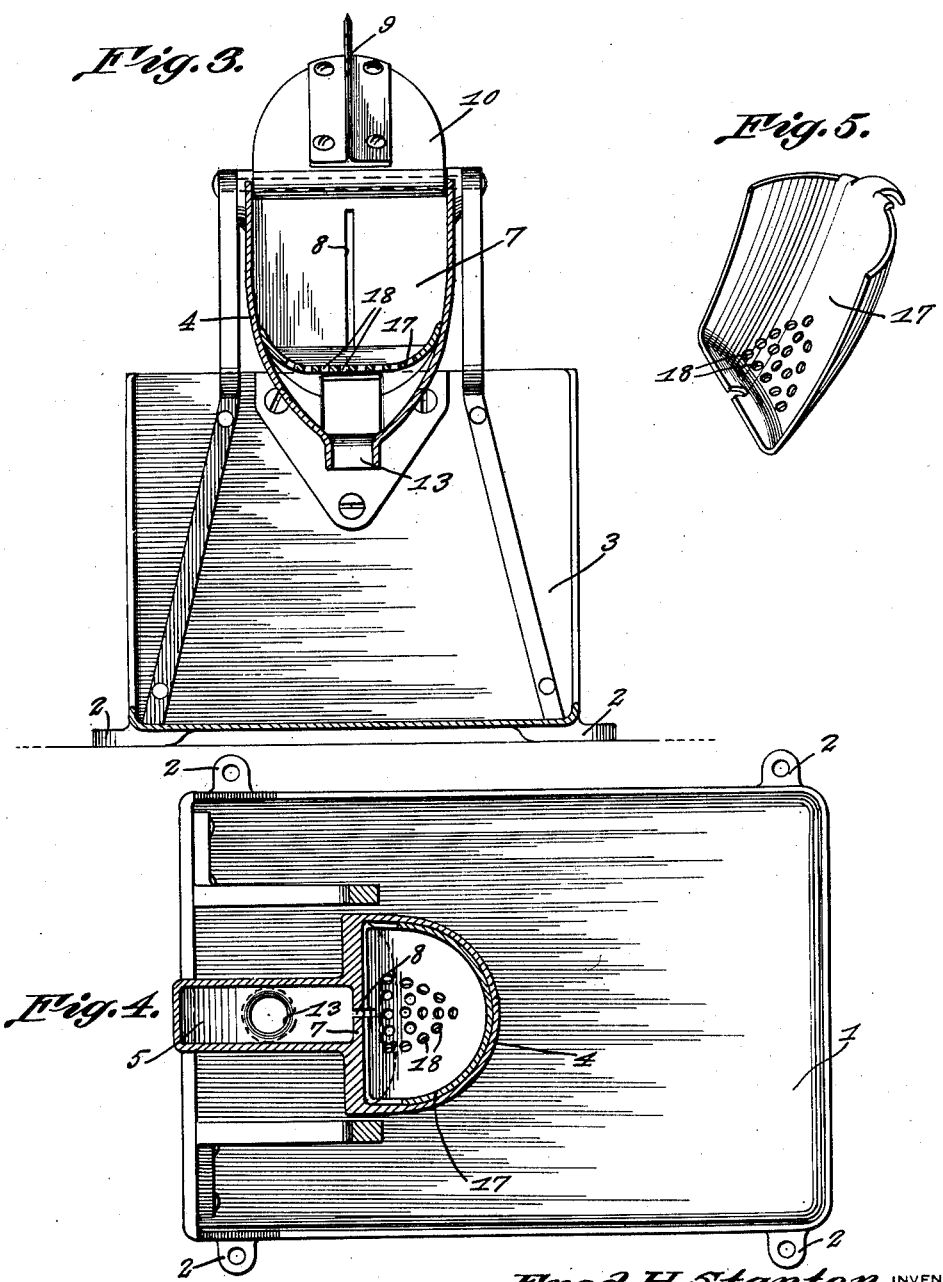
Fred H. Stanton, INVENTOR
BY Victor J. Evans & Co.
ATTORNEY Patented May 17, 1938

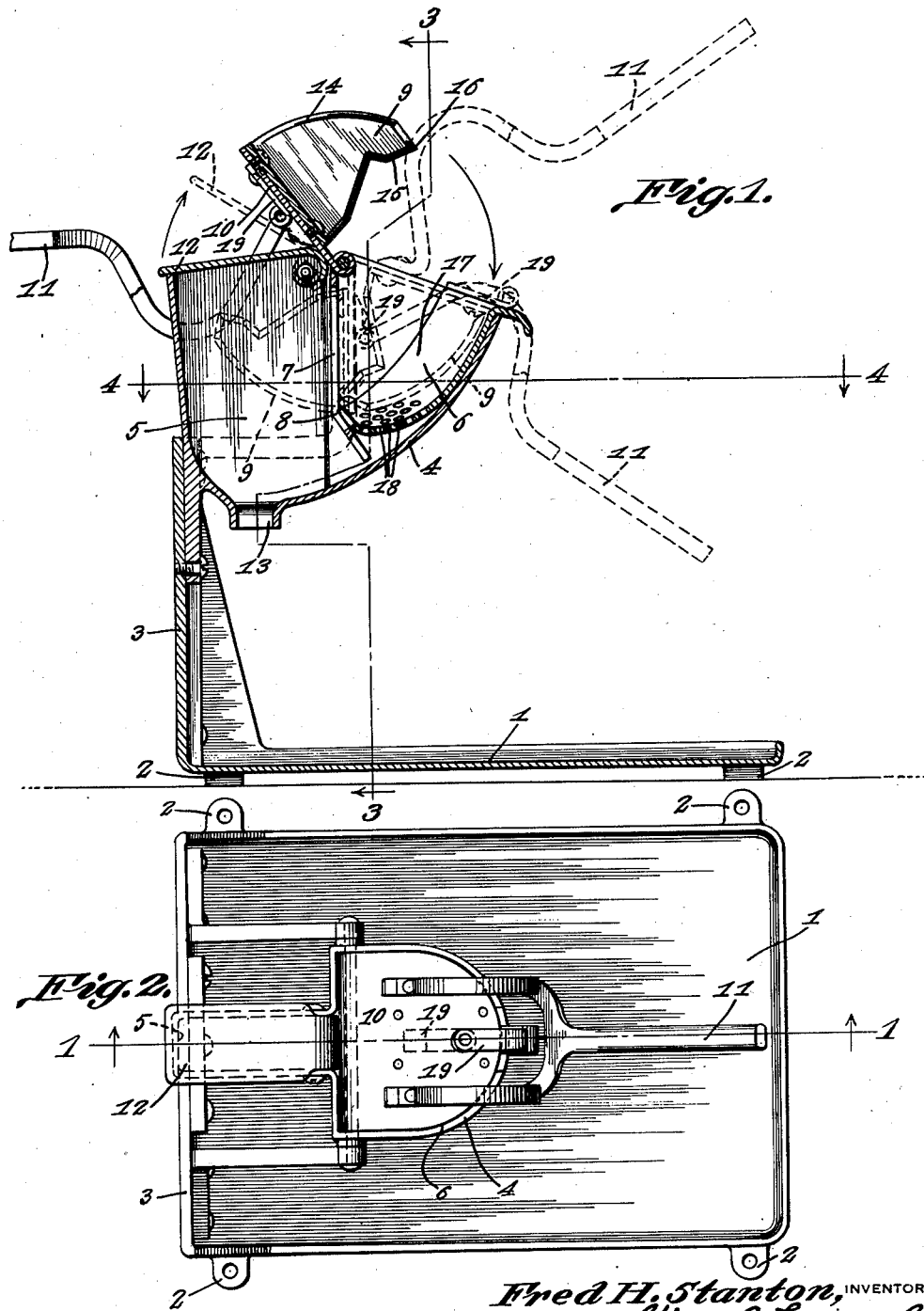

2,117,687

UNITED STATES PATENT OFFICE 2,117,687

SQUEEZER AND CUTTER

Fred H. Stanton, Brady, Tex.

Application February 5, 1936, Serial No. 62,536

1 Claim. (Cl. 100—41)

This invention relates to fruit cutters and squeezers and has for the primary object the provision of a device of this character which will simultaneously sever and squeeze fruit so that a maximum amount of juice may be squeezed therefrom and which is so constructed that the pulp, seeds and skin will be prevented from passing through the device along with the juice and may be readily removed and cleaned thereof, and also the cutting and discharging means may be washed thereby permitting the device to be kept in a sanitary condition.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a fruit cutter and squeezer constructed in accordance with my invention and taken on the line 1—1 of Figure 2.

Figure 2 is a top plan view illustrating the device.

Figure 3 is a sectional view taken on the line 3—3 of Figure 1.

Figure 4 is a sectional view taken on the line 4—4 of Figure 1.

Figure 5 is a perspective view illustrating a strainer.

Referring in detail to the drawings, the numeral 1 indicates a flanged tray having feet 2 apertured to receive fasteners for securing the tray to a counter or like support. An upstanding wall 3 is formed on one end of the tray and has detachably secured thereto a hopper 4 divided into a drain chamber 5 and a squeeze chamber 6 by a squeeze wall 7. The wall 7 is provided with a knife slot 8 through which a knife 9 may move. The knife is detachably secured to a squeeze plate 10. The squeeze plate 10 is shaped to close approximately one-half of the upper end of the hopper 4 and is hinged to the latter and has secured thereto a handle 11. The handle is shaped to straddle the hopper and its movements in opposite directions will move the squeeze plate into and out of the squeeze chamber. A hinged cover 12 closes the other half of the upper end of the hopper. A drain spout 13 is formed on the hopper and is in communication with the drain chamber 5 and is disposed over the tray so that a glass or other container placed on the tray may receive juices from the drain chamber.

The knife 9 is of substantially triangular shape having an arcuately curved cutting edge 14 and a cutting edge 15 having angular portions. The cutting edges 14 and 15 form a point 16.

A strainer plate 17 is removably mounted in the squeeze chamber and has drain openings 18 and is concaved to form a seat for fruit and cooperates with the squeeze wall 7 in supporting the fruit in the hopper so that movement of the squeeze plate 10 in the direction of the squeeze wall 7 will first sever the fruit by the knife passing therethrough and then subjecting the fruit to a squeeze removing the juices therefrom, which juices flow into the drain chamber 5 and then into the glass or like container by way of the drain spout 13.

A pivoted latch 19 is provided on the squeeze plate and when in one position may engage with the strainer plate 17 for supporting the squeeze plate in a position for closing the squeeze chamber of the hopper. The squeeze plate then cooperates with the cover 12 in excluding dirt and other foreign matter from the hopper.

The strainer plate 17 is removable so that it can be readily cleaned and also water may be poured through the drain chamber 5 for cleansing the walls of the latter and the knife blade.

Having described the invention, I claim:

A fruit cutter and squeezer comprising a hopper having an open upper end and a drain in the lower end, a squeeze wall dividing said hopper into a squeeze chamber and a drain chamber and having a knife slot and a portion bent to extend angularly to provide a rest, a strainer extending into the squeeze chamber and engaging the rest and acting as a partial support for fruit in the squeeze chamber, a squeeze plate hinged on the hopper and movable into the squeeze chamber to force fruit against the squeeze wall, a knife blade fixed on the squeeze plate to move in advance thereof for severing the fruit and adapted to enter the drain chamber by way of said slot, a handle for operating the squeeze plate, a catch on said squeeze plate to be positioned to contact the strainer for supporting the squeeze plate in position for closing the squeeze chamber, and a hinged cover for the drain chamber.

FRED H. STANTON.